H. BLOM.
FLANGE CONNECTION.
APPLICATION FILED SEPT. 18, 1918.
1,295,263.
Patented Feb. 25, 1919.
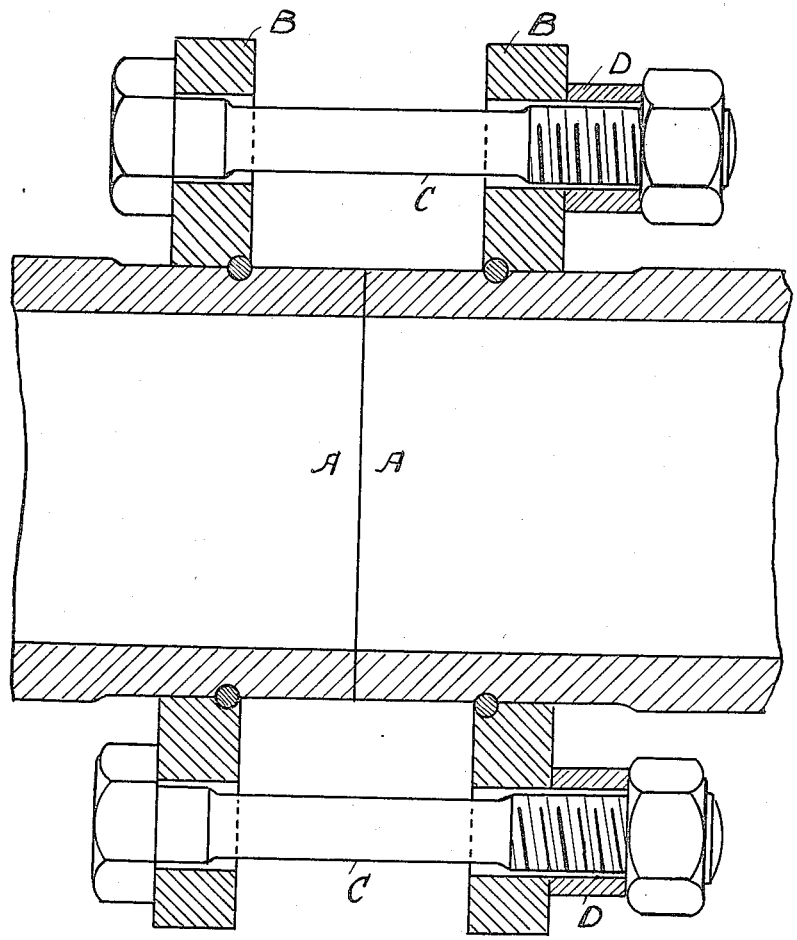

UNITED STATES PATENT OFFICE.

HANS BLOM, OF RJUKAN, NORWAY, ASSIGNOR TO NORSK HYDRO-ELEKTRISK KVAELSTOFAKTIESELSKAB, OF CHRISTIANIA, NORWAY.

FLANGE CONNECTION.

1,295,263.  Specification of Letters Patent.  Patented Feb. 25, 1919.

Application filed September 18, 1918. Serial No. 254,594.

*To all whom it may concern:*

Be it known that I, HANS BLOM, a subject of the King of Norway, of Rjukan, Norway, have invented certain new and useful Improvements in Flange Connections; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In flange connections for cooking tubes surrounded by steam jackets it is difficult to obtain a tight joint owing to the fact that the bolts are heated by the steam to a higher temperature than the cooking tube itself and thereby expand, so that the joint becomes untight. When a packing or packing box is used for the connection the said disadvantage is less remarkable, and it is possible to obtain a tight connection provided the screws are sufficiently tightened in a cold condition. If however the flange connection is used without packing, which is the case when the tube is to conduct corrosive fluids, such as strong acids or the like, even a small expansion of the screw bolts will cause leakage in the joint, and as it is impossible to tighten the bolts during the operation steam may enter the cooking tube. According to the present invention a tight connection is obtained even when the bolts are located inside a steam jacket so as to be inaccessible, and this is obtained by the use of a support for the nut or head of the tightening bolt and sleeve consisting of a material having a larger coefficient of expansion than the material in the bolt itself. In this manner it is even possible to obtain that the flange connection is further tightened at a rise in temperature, it being only necessary to choose the length of the separating sleeve, and the expansion coefficient of the same in such a manner, that it will always expand more than the bolt.

A suitable form of the invention is illustrated on the drawing.

A, A is a cooking tube and B, B the flange which may be integral with the tube or fastened to the tube ends by means of rings placed in grooves of the tube furnace. The flanges are connected by means of screw bolts C, and the nuts of said screw bolts are supported by means of metal sleeves D, which may rest against one flange, as illustrated, or be placed on both sides of the flange connection.

Claims:

1. In a flange connection for tubes or the like, screw bolts passing through holes in both flanges and distance pieces between the flanges and the nuts or heads of said screw bolts the length and expansion coefficient of said distance pieces being so chosen as to compensate the expansion of the screw bolts owing to rises in temperature so as to obtain tight connection under all conditions.

2. In a flange connection for tubes or the like, screw bolts passing through holes in both flanges and sleeves inclosing the screw bolts between the flanges and the heads or nuts of the same, the expansion coefficient of said inclosing sleeves being larger than the expansion coefficient of the screw bolts with the object of compensating the expansion of the screw bolts owing to rises in temperature so as to obtain tight connection under all conditions.

In testimony that I claim the foregoing as my invention, I have signed my name in presence of two subscribing witnesses.

HANS BLOM.

Witnesses:
 C. NORMAN,
 C. FABRICIUS HANSEN.